US007474829B2

(12) United States Patent
Xia et al.

(10) Patent No.: US 7,474,829 B2
(45) Date of Patent: Jan. 6, 2009

(54) ASSEMBLIES AND METHODS FOR DROP CABLE

(75) Inventors: Tiejun J. Xia, Richardson, TX (US); Glenn A. Wellbrock, Wylie, TX (US); James P. Dacey, Taunton, MA (US)

(73) Assignees: Verizon Services Organization, Inc., Irving, TX (US); Verizon New England, Inc., Boston, MA (US)

( * ) Notice: Subject to any disclaimer, the term of this patent is extended or adjusted under 35 U.S.C. 154(b) by 0 days.

(21) Appl. No.: 11/689,805

(22) Filed: Mar. 22, 2007

(65) Prior Publication Data

US 2008/0232757 A1   Sep. 25, 2008

(51) Int. Cl.
*G02B 6/00* (2006.01)
(52) U.S. Cl. ..................................................... 385/136
(58) Field of Classification Search .......... 385/134–137
See application file for complete search history.

(56) References Cited

U.S. PATENT DOCUMENTS 6,466,727 B1 * 10/2002 Leeb .......................... 385/137
7,072,558 B2 *  7/2006 Tull .......................... 385/135

* cited by examiner

*Primary Examiner*—Sarah Song

(57) ABSTRACT

Assemblies and methods for installing and maintaining aerial fiber optic cable are provided. Embodiments include a cable long enough to extend from two elevated support points and to provide enough slack for at least a portion of the cable to extend along the ground. The cable includes a wrapped portion for storing the slack and to elevate the entire cable above the ground. The wrapped portion being releasable in response to a force acting on the cable, such as a falling tree, allowing for at least a portion of the cable to fall to the ground and minimize the likelihood of the tree snapping the cable. Fasteners and frame members may be employed to support the wrapped portion. An embodiment may also include a cut-off apparatus for cutting the cable in response to the cable being pulled further once any slack in the cable has been expended.

21 Claims, 10 Drawing Sheets

ASSEMBLIES AND METHODS FOR DROP CABLE

BACKGROUND INFORMATION

In general, a fiber to the premises (FTTP), also referred to as fiber to the home (FTTH), system includes one or more passive optical networks configured to deliver media content, in the form of optical signals, from a provider's central office to a plurality of subscribers' homes. The passive optical network includes a series of fiber links extending between the central office, homes, and other components of the network.

Many of the fiber links are suspended above ground between telephone poles and other structures. For example, in the "last-mile" or "last-kilometer" of the network, a series of fiber links may be suspended above ground between a splicing component and the subscribers' homes.

Any fiber link suspended above ground is susceptible to a number of hazards, such as fallen tree limbs, wind, or ice that could damage the fiber optic cable. The damage could be in the form of a number of cuts or a complete break in the fiber link. A damaged fiber link may distort, diminish, or terminate the fiber optic cable's ability to carry an optical signal and thus interfere with the provider's ability to provide service to a particular subscriber or subscribers. In addition to potentially damaging the provider's goodwill with its subscribers, such damage also adds to the provider's cost of maintaining the network.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
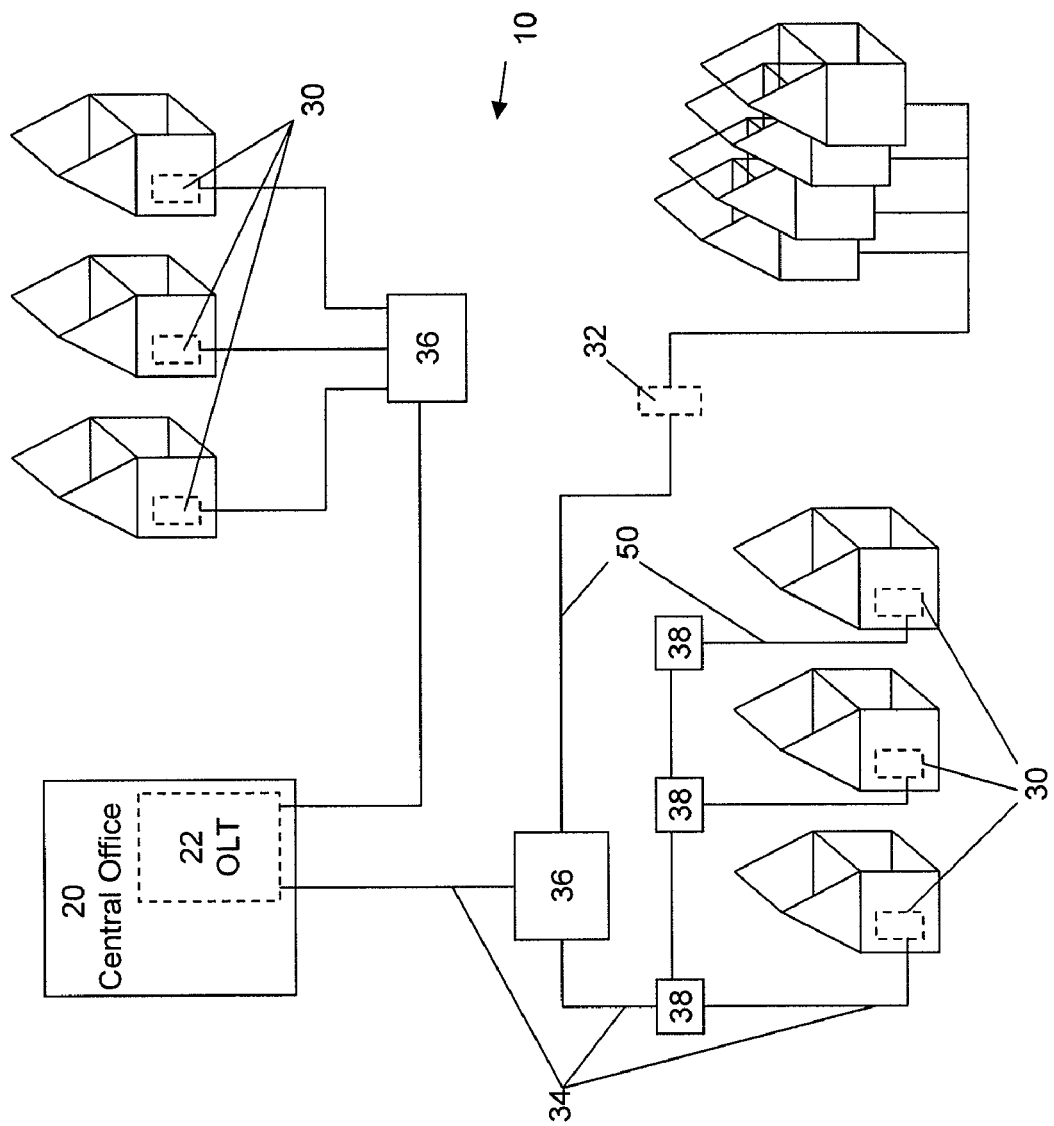
FIG. 1 is a block diagram of an optical fiber network consistent with exemplary embodiments.

Exemplary embodiments relate to fiber optic networks. A fiber optic network includes a series of interconnected fiber cable links or branches extending between terminals and other network components. As an example, a fiber to the premises (FTTP), also referred to as fiber to the home (FTTH), system includes one or more fiber optical networks. As illustrated in FIG. 1, a FTTP system may include or otherwise be in communication with a provider's central office 20 that delivers optical signals to a plurality of subscribers through a passive optical network or PON 10. The passive optical network 10 may include an optical line terminal (OLT) 22 at the provider's central office and a plurality of optical network terminals (ONTs) 30 located at the premises of the subscribers, e.g. a customer home. The passive optical network 10 may also include one or more optical network units (ONUs) 32 that function as gateways to additional subnetworks associated with other systems, such as fiber to the curb (FTTC) and fiber to the neighborhood (FTTN) systems. The OLT 22 can be connected to the ONTs 30 and ONUs 32 through a series of fiber link assemblies 34 and one or more fiber distribution hubs 36. The FTTP system may further include splicing components 38 for joining or separating fiber optic cable or, more particularly, one or more of the fibers within a cable.

A fiber link assembly 34 may include a fiber optic cable 50 or a portion of a fiber optic cable 50, e.g., one or more optical fibers, extending between two components of the network system. As examples and as illustrated in FIG. 1, a fiber link assembly 34 may include a fiber optic cable 50 extending between an OLT 22 and a fiber distribution hub 36, a fiber optic cable 50 extending between a fiber distribution hub 36 and a splicing component 38, or a fiber optic cable 50 extending between a splicing component 38 and an ONT 30.

Figure 2A:
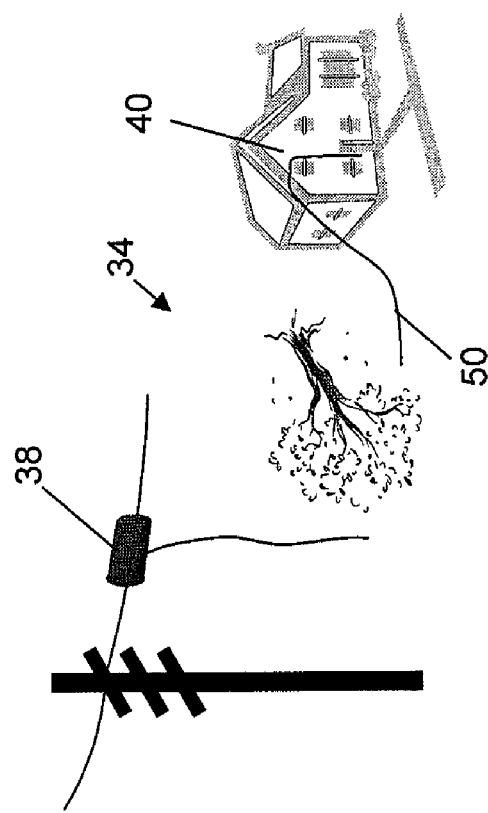
FIG. 2a is an illustration of a fiber link assembly extending between a splicing component and a house.
Figure 2B:
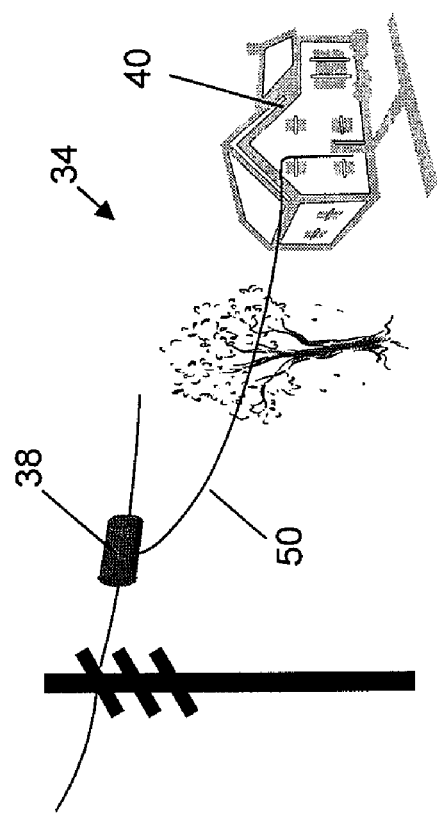
FIG. 2b is an illustration of the fiber link assembly of FIG. 2a damaged from a fallen tree.

Many of the fiber link assemblies may be above ground. For example and as illustrated in FIG. 2a, a fiber link assembly 34 may include a fiber optic cable 50 supported above ground between a splicing component 38 and a house 40 or more particularly an ONT at the house. A fiber link assembly 34 that includes a fiber optic cable 50 supported above ground may also be referred to as an aerial fiber link. An aerial fiber link assembly 34 may be susceptible to several hazards including bad weather (e.g., wind or ice), overhead obstructions, and falling trees or branches. Fallen trees may be an especially acute problem in some residential environments where many trees are taller and adjacent to one or more aerial fiber link assemblies. A fallen tree, as shown in FIG. 2b, may cause cuts or a total break in the fiber optic cable 50 referred to as a "cable drop."

Figure 3:
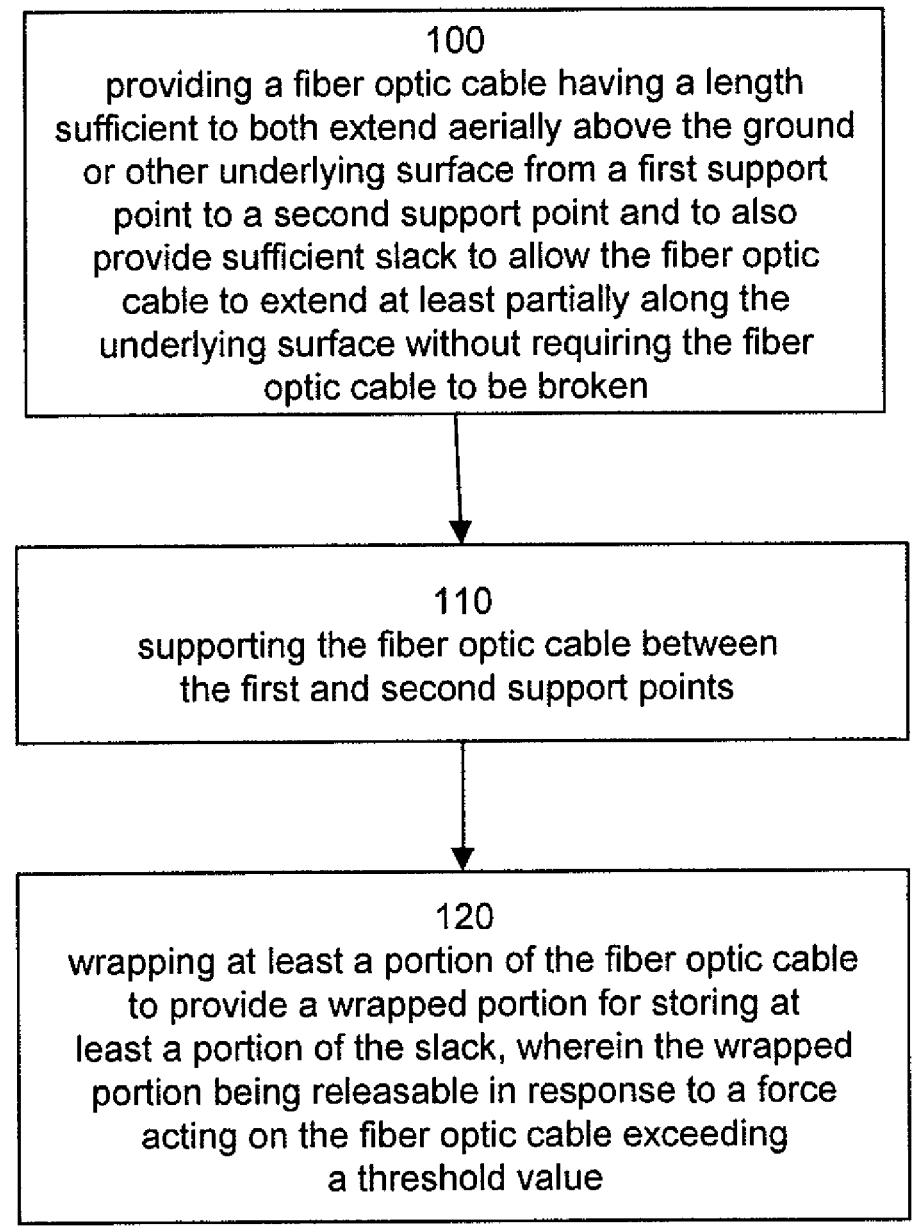
FIG. 3 illustrates a flow chart according to an exemplary embodiment.

According to an exemplary embodiment, an aerial fiber link assembly installation method is provided to minimize potential damage to the fiber optic cable from falling trees and other hazards. The method, as illustrated in FIG. 3, may include providing a fiber optic cable having a length sufficient to both extend aerially above the ground or other underlying surface from a first support point to a second support point and to also provide sufficient slack to allow the fiber optic cable to extend at least partially along the underlying surface without requiring the fiber optic cable to be broken 100 and supporting the fiber optic cable between the first support point and the second support point 110. The support points may be an ONT mounted to a wall, a splicing component supported along an additional fiber optic cable or a telephone pole, or other elevated, i.e. above ground, support structure. The underlying surface may be the ground or another surface defined by a structure, such as a roof structure, above which the fiber optic cable extends. The method may further include wrapping at least a portion of the fiber optic cable to provide a wrapped portion for storing at least a portion of the slack. The wrapped portion may be releasable in response to a force acting on the fiber optic cable exceeding a threshold value 120.

The size of the wrapped portion, i.e., the length of the wrapped portion, relative to the rest of the fiber optic cable may vary. In general, a larger wrapped portion provides for more stored slack of the fiber optic cable. As illustrated in FIG. 4a, the wrapped portion may tighten the fiber optic cable enough such that the entire fiber optic cable extends above the underlying surface.

The position and number of wrapped portions may vary. In particular, a wrapped portion may be positioned at any location along the fiber optic cable between the first support point and the second support point. Also, the method may include wrapping more than one wrapped portion.

Figure 4B:
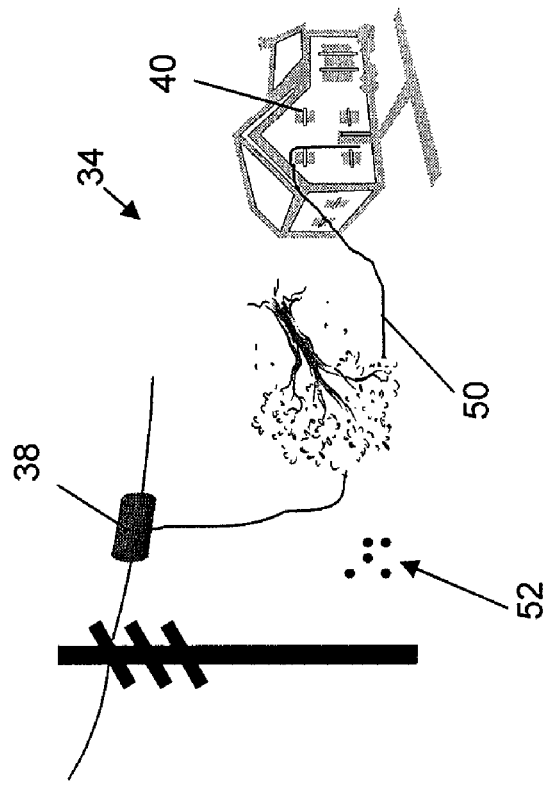
FIG. 4b is an illustration of the fiber link assembly of FIG. 4a in which the slack of the cable has been released in response to a fallen tree consistent with exemplary embodiments.
Figure 4A:
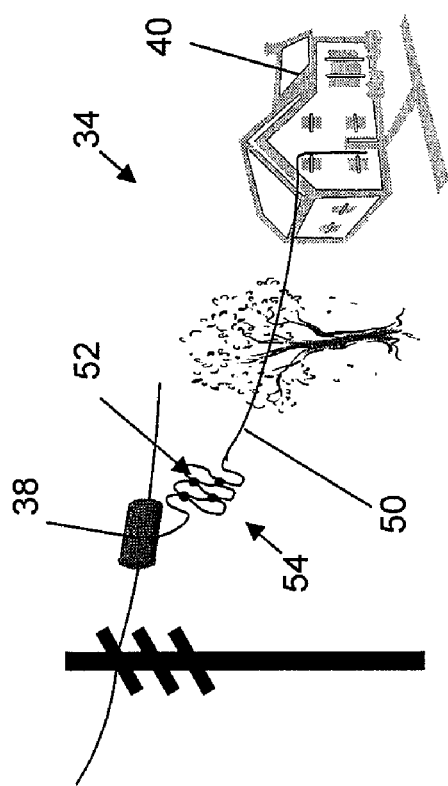
FIG. 4a is an illustration of a fiber link assembly of FIG. 2a having a wrapped portion for storing cable slack consistent with exemplary embodiments.
Figure 5:
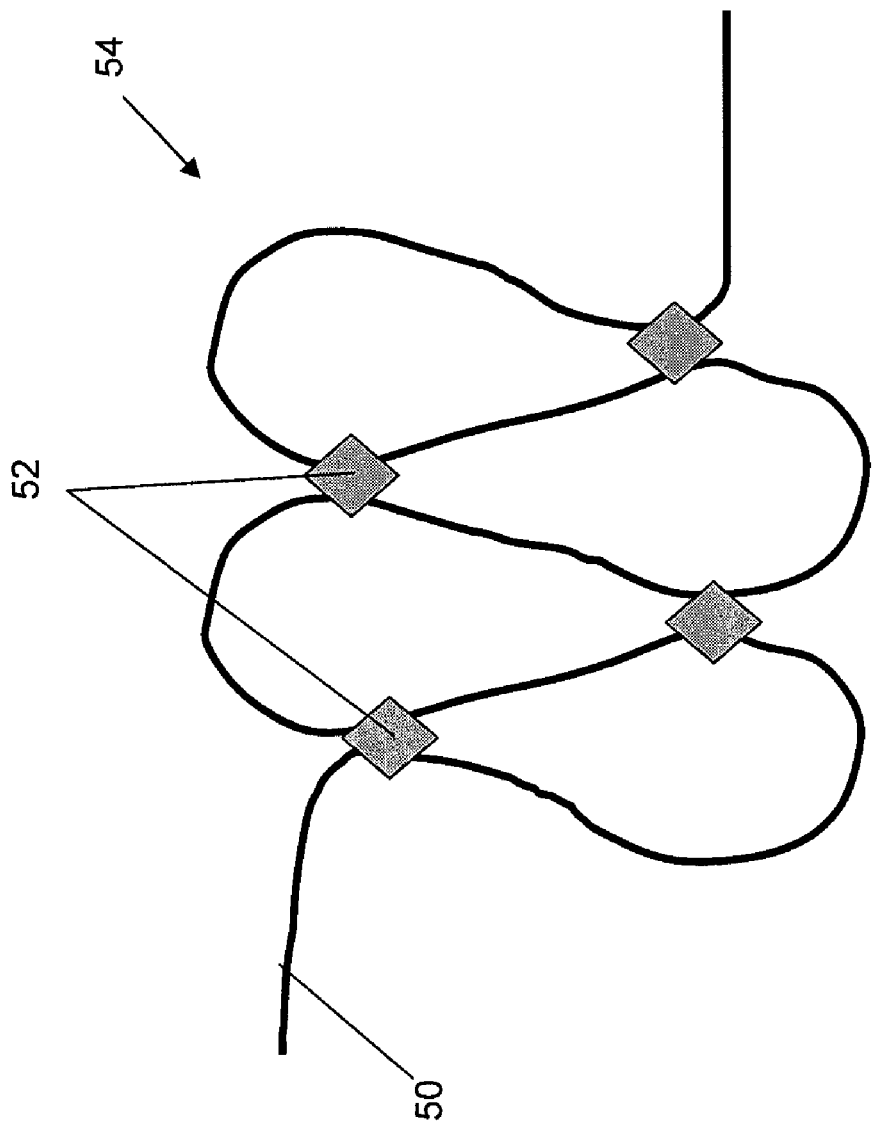
FIG. 5 is a schematic view of the wrapped portion of FIG. 4a according to an exemplary embodiment.

FIGS. 4a through 5 illustrate an example of a fiber link assembly 34 configured to wrap and thus store at least some of the slack in the fiber optic cable 50. The wrapped portion 54 may include multiple folds in a portion of the fiber optic cable 50. The folds may be made in a back and forth or serpentine manner, referred to herein as a serpentine wrap. The wrapped or folded configuration may be held together by one or more releasable fasteners 52. The releasable fasteners 52 may include clips, ties, adhesive, or other structures configured to hold two adjacent portions of the fiber optic cable 50 together. More specifically, according to exemplary embodiments, the fasteners 52 are configured to hold two adjacent portions of the fiber optic cable 50 together up to the predetermined threshold value. Once a force that exceeds the predetermined threshold value is applied to the fiber optic cable 50, the fasteners 52 release the wrapped portion and thus the slack in the fiber optic cable 50. For example and as illustrated in FIG. 5b, the weight of the tree on the fiber optic cable 50 applies a force greater than the predetermined threshold value. Therefore in response to the tree falling onto the fiber optic cable 50, the fasteners 52 release the wrapped portion. Releasing the wrapped portion allows for the slack in the fiber optic cable 50 to fall at least partially to the ground and reduce the likelihood of the tree breaking the fiber optic cable 50, thereby permitting service continuity to the customer.

The predetermined threshold value may be determined through various methods. For example, the predetermined threshold value may be based upon an expected stress value from the weight of the fiber optic cable and in some embodiments even a greater stress value to account for other expected and routine forces, such as the swinging of the fiber optic cable during wind storms, ice build up on the fiber optic cable, and/or animals resting or moving along the fiber optic cable that should not cause the fiber optic cable to break. In other embodiments, the predetermined threshold value may be determined by a maximum stress or force that the fiber optic cable may withstand without breaking or the maximum force that the support points may withstand without breaking or otherwise being damaged.

Figure 6:
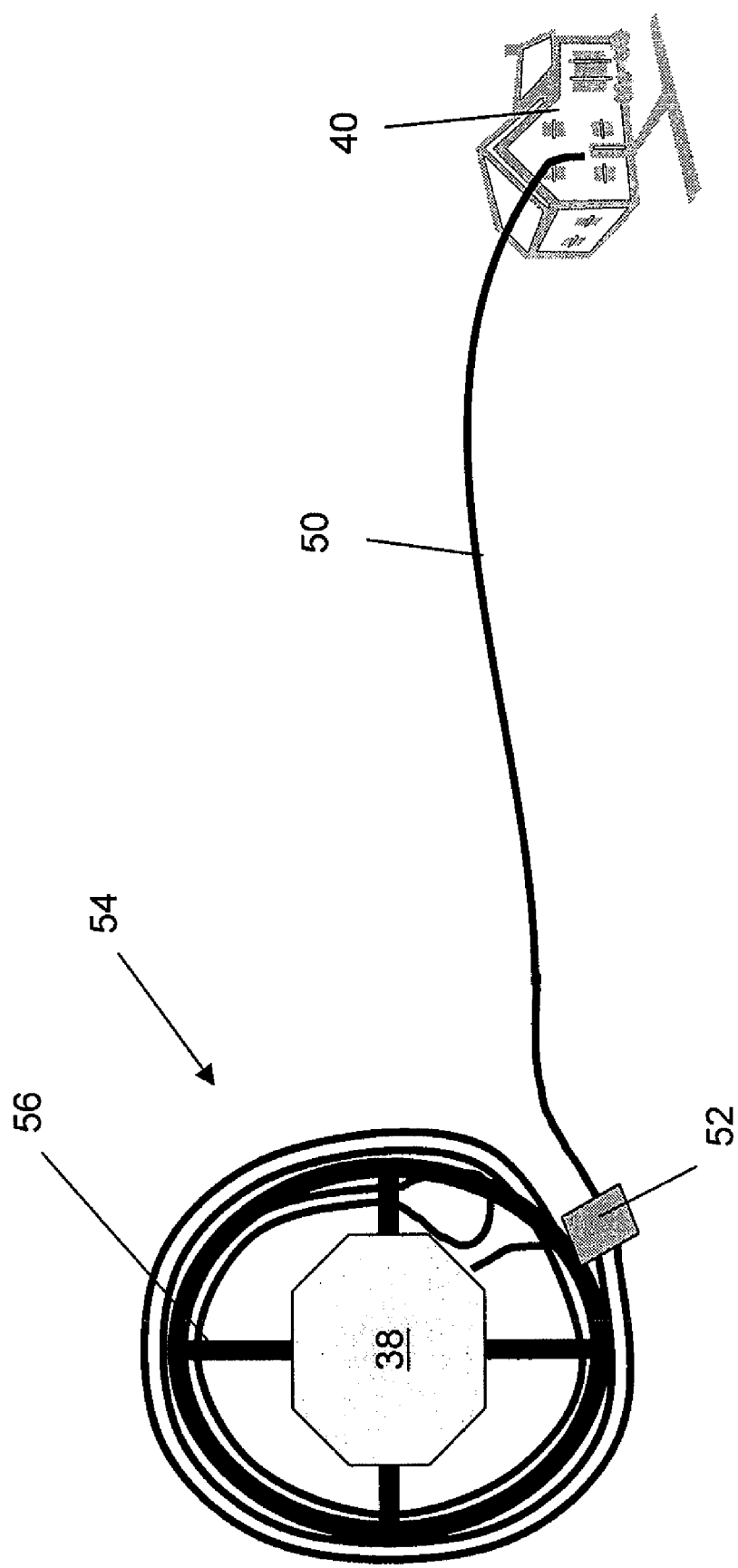
FIG. 6 is a fiber link assembly according to another exemplary embodiment.
Figure 7:
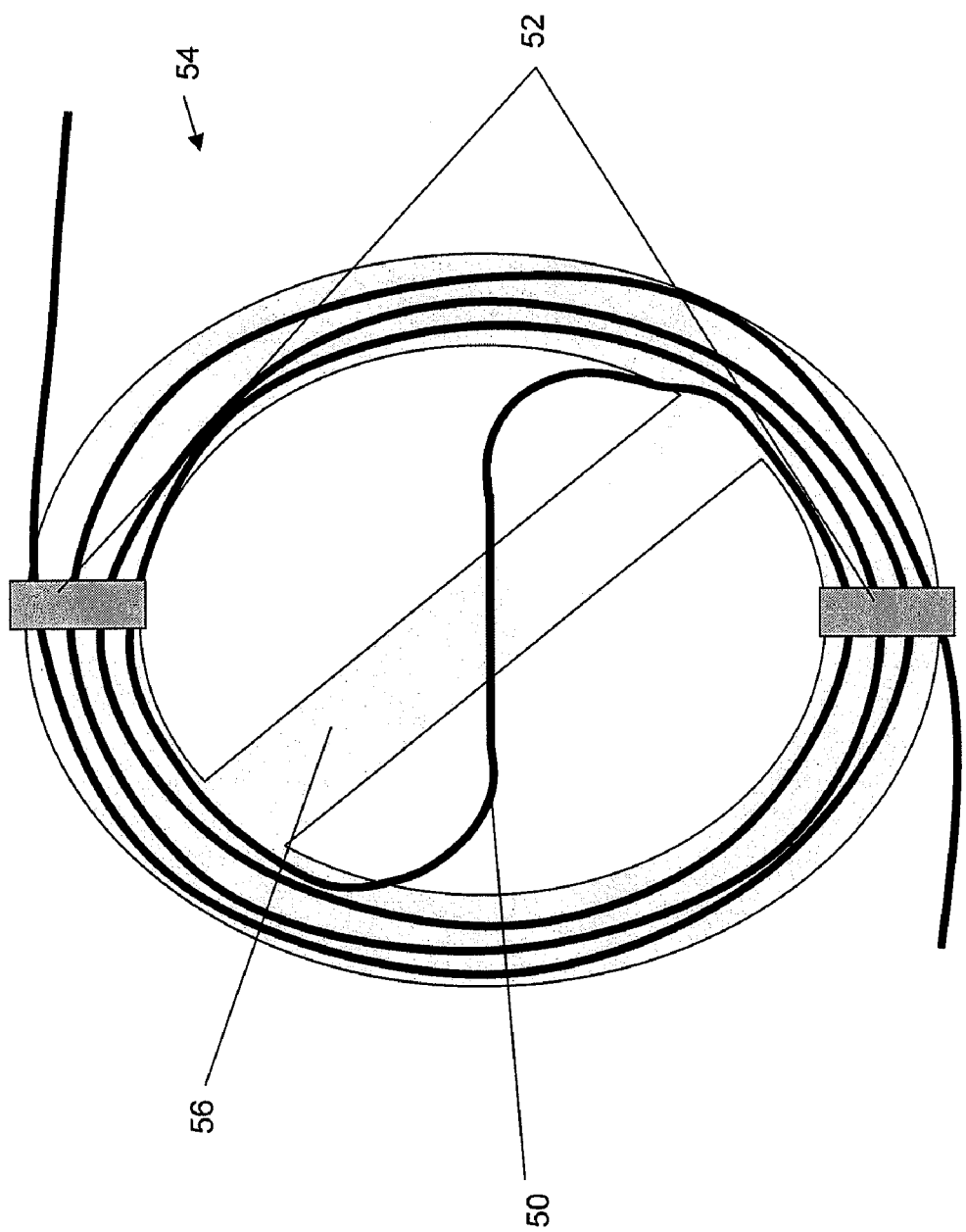
FIG. 7 is a fiber link assembly according to yet another exemplary embodiment.

In addition to or instead of the releasable fasteners 52, the fiber link assembly 34 may include a frame member 56 for supporting the wrapped portion. For example, the frame member 56 may be used to wrap at least a portion of the fiber optic cable 50 and store at least a portion of the slack in the fiber optic cable. As illustrated in FIG. 6, the frame member 56 may be connected to or part of a splicing component 38 or other support point. As another example and as illustrated in FIG. 7, the frame member 56 may be positioned between the two support points, such as the splicing component 38 and the house 40. As yet another example and as illustrated in FIG. 8, the frame member 56 may be mounted to a wall of the house 40.

Referring back to FIG. 6, the support frame member 56 may be configured to remain substantially stationary. A portion of the fiber optic cable 50 may be wrapped around or within the frame member 56 in order to store slack. The fiber optic cable 50 may be held in place by at least one fastener 52 that is configured to release the slack of the fiber optic cable 50 in response to an applied force of at least the predetermined threshold value. The at least one fastener 52 may be configured to hold two portions of the fiber optic cable 50 together and/or to hold at least one portion of the fiber optic cable 50 to the frame member 56 such that the slack between the two portions of the fiber optic cable or the slack between the portion of the fiber optic cable and the frame member is stored about or within the frame member. Once released, the portion of the fiber optic cable 50 wrapped around or within the frame member 56 is free to fall downwardly and/or outwardly away from the support frame member 56. Storing the slack of the fiber optic cable 50 at or near the splicing component 38 may help to limit access to the slack and the fastener 52 and minimize unauthorized or inadvertent release of the slack by unauthorized individuals. The slack in the fiber optic cable 50 may be restored following release by rewrapping the portion of the fiber optic cable 50 around the support frame member 56 and reapplying at least one fastener 52.

Referring back to FIG. 7, the support frame member 56 may be releasable from the fiber link assembly 34. According to this embodiment, a portion of the fiber optic cable 50 is wrapped in a coil configuration, also referred to herein as a coil wrap, and the coil wrap is held in place against the frame member 56 by two releasable fasteners 52. Once release, the coil wrap releases the slack of the fiber optic cable 50 and the frame member 56 falls toward the underlying surface.

Figure 8:
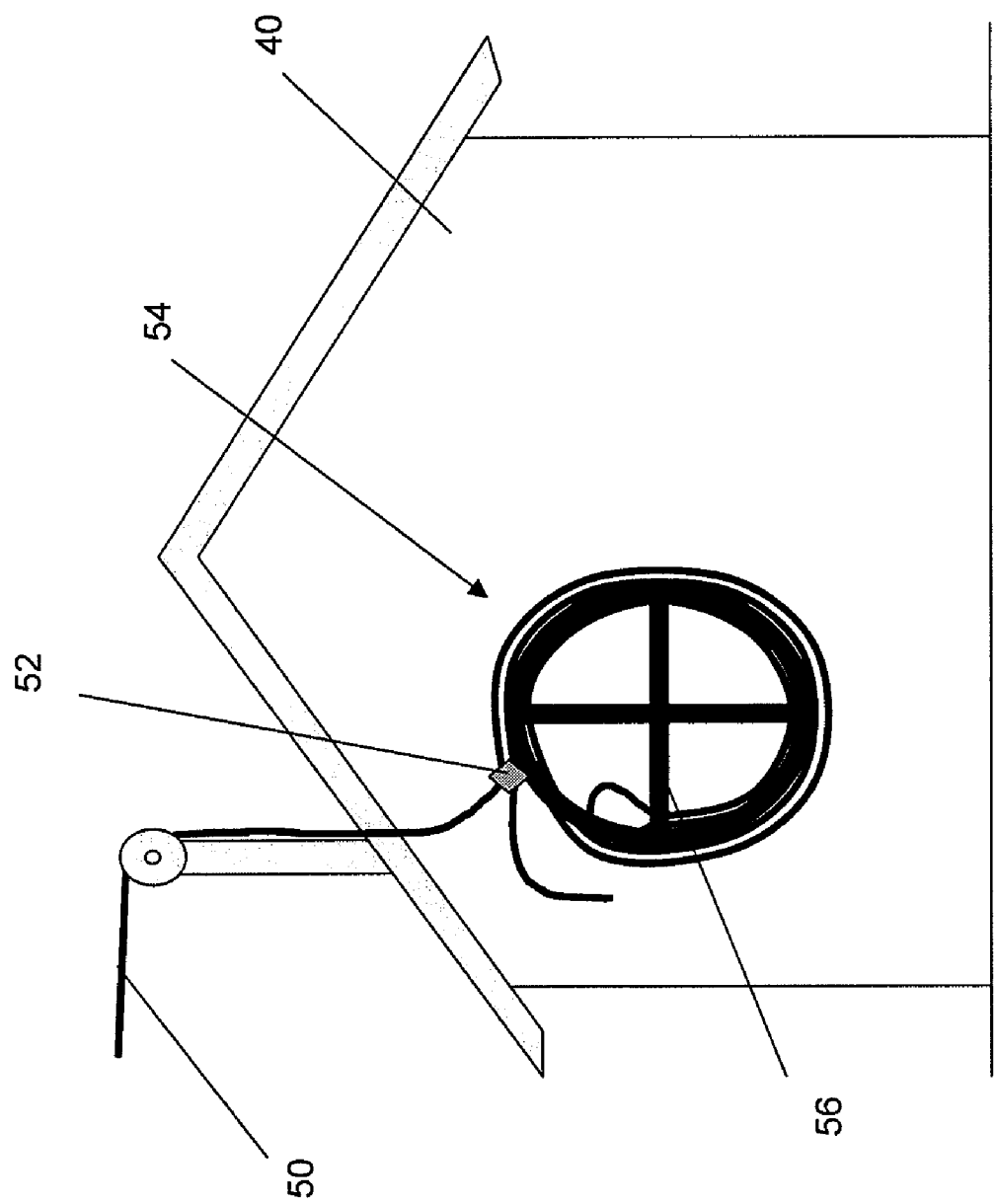
FIG. 8 is a fiber link assembly according to an exemplary embodiment shown in an environment of a subscriber's house.

As illustrated in FIG. 8, the support frame member 56 may be rotatable. More specifically, according to this exemplary embodiment, the support frame member 56 is rotatably mounted to a wall of the house 40 and a portion of the fiber optic cable 50 is attached to the support frame member 56. In order to wrap a portion of the fiber optic cable 50 and take up slack within the cable 50, the frame member 56 may be rotated in a first rotational direction such that a portion of the fiber optic cable 50 becomes wrapped around the frame member 56. The wrapped configuration of the fiber optic cable 50 may be retained by a resistance of the frame member 56 to rotate and/or by at least one fastener 52 configured to hold two portions of the fiber optic cable 50 together or to hold one portion of the fiber optic cable 50 to the frame member 56. To unwrap the fiber optic cable 50, i.e., to release slack in the fiber optic cable 50, the frame member 56 may be rotated in a second rotational direction, generally opposite the first rotational direction, such that the portion of the fiber optic cable 50 wrapped around the frame member 56 is unwrapped or unwound. The rotation of the frame member 56 and thus the wrapping and unwrapping of the fiber optic cable 50 may be done by an operator. The frame member 56 may further include a handle for the operator. For unwrapping the fiber optic cable 50 enough force may be necessary to overcome the resistance to rotation in the support frame member 56 and/or the at least one fastener 52, this force may be applied by a fallen tree or other external force acting on the fiber optic cable 50 in such a manner as to cause the frame member 56 to rotate in the second rotational direction. The placement of the support frame member 56 and/or fastener 52 near or even in the house may allow easier access to such components which may allow the home owner to rewrap the fiber optic cable 50 after the fiber optic cable 50 is dropped to the ground during a storm or other event. Allowing the home owner to rewrap the fiber optic cable 50 may decrease the time necessary to repair any damage to the fiber network after a storm and reduce cost by reducing the number of maintenance teams needed to go into the field in order to repair the damage.

Figure 9:
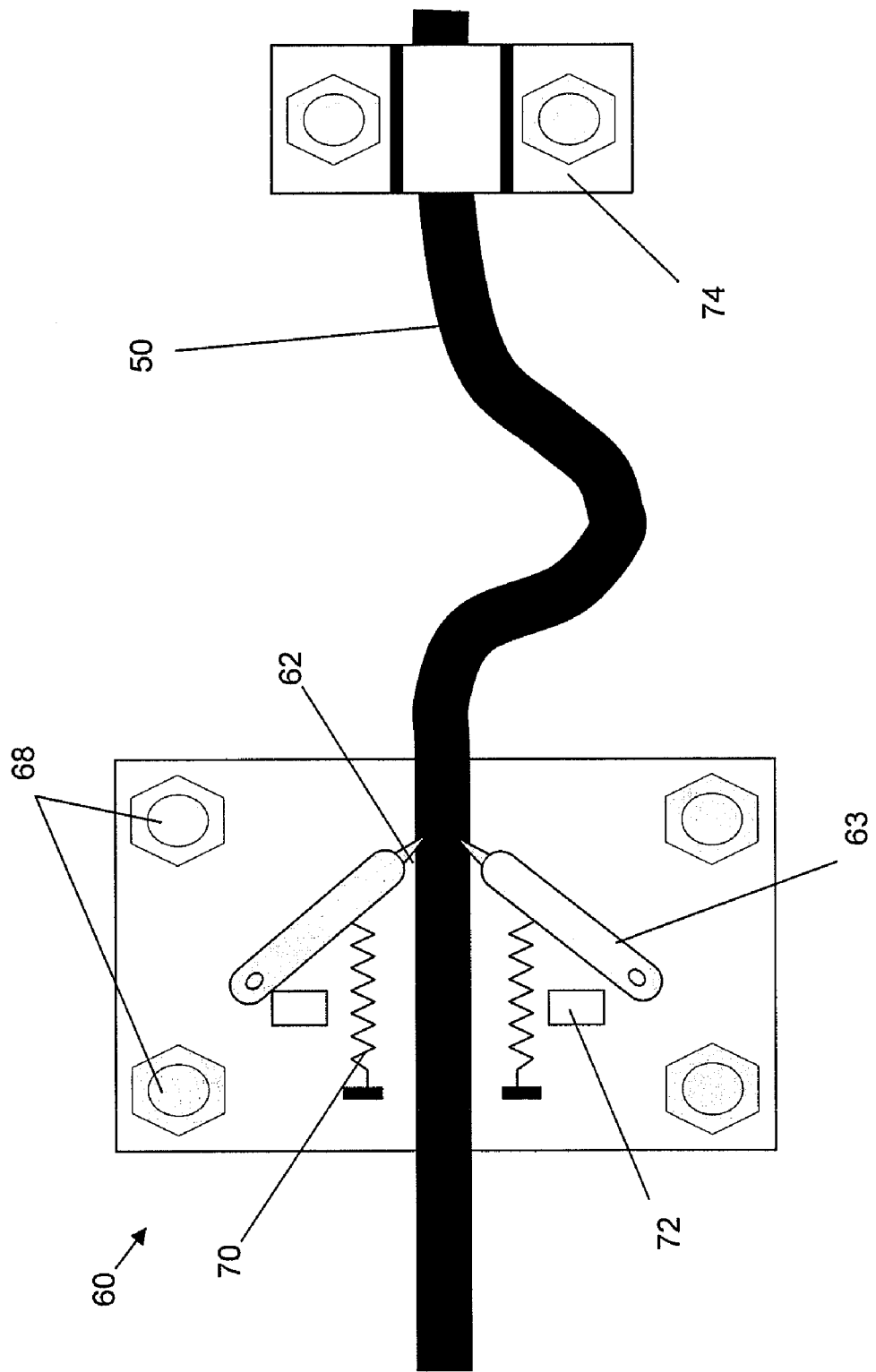
FIG. 9 is a cable pinching apparatus in a first position according to an exemplary embodiment.
Figure 10:
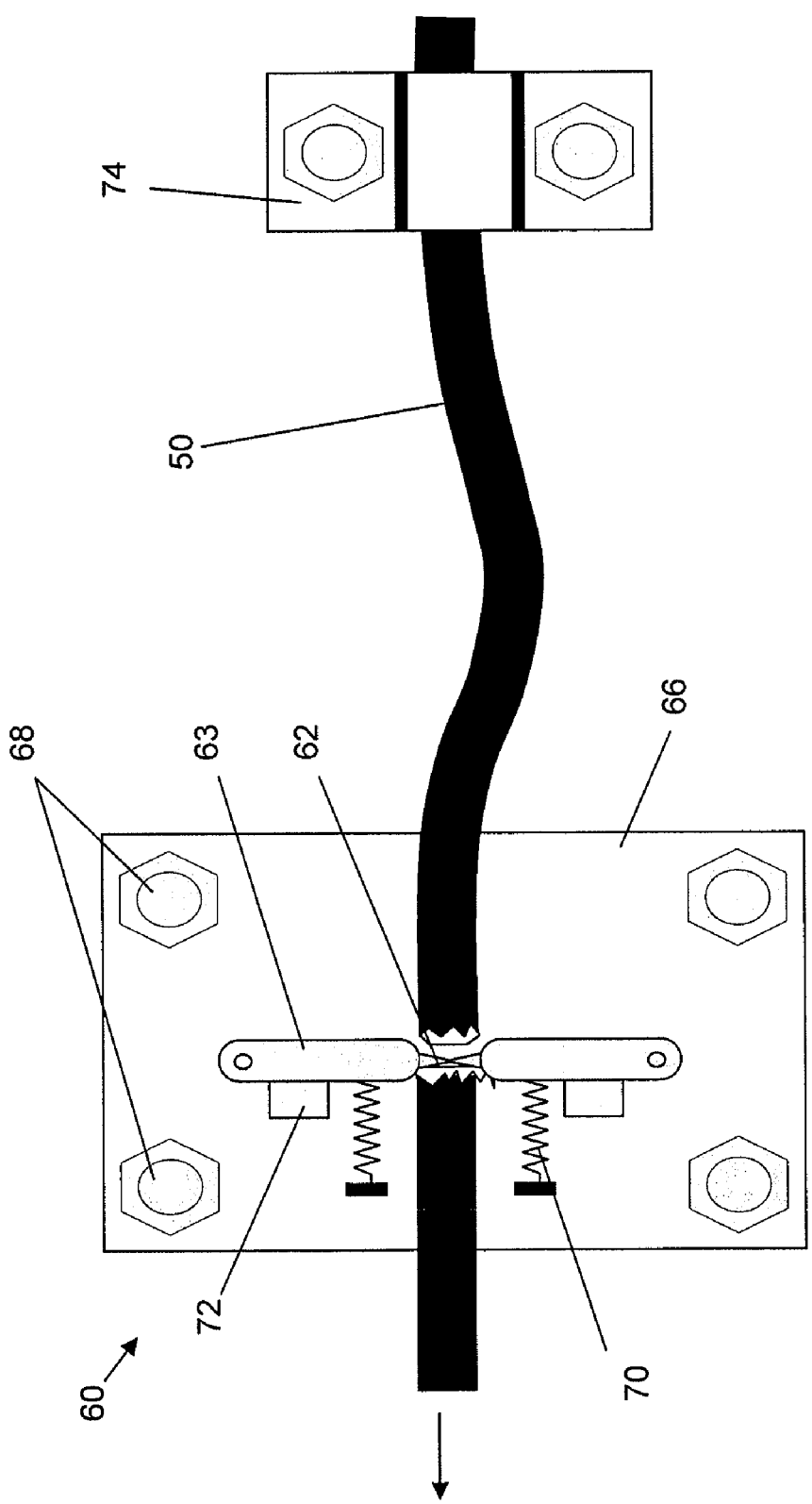
FIG. 10 is the cable pinching apparatus of FIG. 8 in a second position according to an exemplary embodiment.

The fiber link assembly 34 according to exemplary embodiments may have a cable cut-off apparatus 60 to minimize potential damage to a house or other structure in instances when the fiber optic cable 50 is pulled beyond any slack within the fiber optic cable 50. For example and as illustrated in FIGS. 9 and 10, a cable cut-off apparatus 60 may include two cutting blades 62. The cutting blades 62 may be moveable between a first position as illustrated in FIG. 9 and a second position as illustrated in FIG. 10. In the first position, the cutting blades 62 may define an opening in which at least a portion of the fiber optic cable 50 may extend through. And in the second position, the cutting blades 62 may close the opening and cut the fiber optic cable 50. Moreover, the cut-off apparatus 60 may be configured to have the cutting blades 62 move to the second position and thus cut the fiber optic cable 50 in response to the fiber optic cable 50 being dragged or pulled beyond the slack within the fiber optic cable 50. By cutting the fiber optic cable 50 in response to the fiber optic cable 50 being pulled beyond its slack, the likelihood that the fiber optic cable 50 may damage the house or other structure is minimized. In other words, instead of the fiber optic cable 50 exerting force against the support point 74 attached to the house 40 after the slack is removed, the fiber optic cable 50 is cut as best shown in FIG. 10. Additionally, the cutting blades 62 provide for a clean cut as opposed to the uncontrolled break of the fiber optic cable 50 that may otherwise be created.

In addition to the one or more cutting blades 62, the cut-off apparatus 60 may also include a cutting blade mount 66, one or more fasteners 68, one or more support arms 63, one or more springs 70, and one or more stops 72. The cutting blade mount 66 may be a plate that is mountable to a wall or other structure. The fasteners 68, such as nuts and bolts, may be employed to hold the cutting blade mount 66 to the wall. Each support arm 63 may extend from a first end to a second end. The first end may be rotatably attached to the cutting blade mount 66. And each cutting blade 62 may extend from a second end of one of the support arms 63. Each cutting blade 62 may be at least partially biased in the first position by one of the springs 70 acting on one of the support arms 63. Each cutting blade 62 may be inhibited from moving beyond the second position by one of the stops 72.

In the first position, the cutting blades 62 may pinch the fiber optic cable 50, i.e., the cutting blade engages and may partially pierce an outer sheath of the fiber optic cable but does not otherwise substantially interfere with the transmission of the optical signals through the fiber optic cable. Due to the engagement between the cutting blades 62 and the fiber optic cable 50, movement of the fiber optic cable 50 in at least a direction into the cutting blades 62 creates a tendency of the cutting blades 62 to move with the fiber optic cable 50. If the movement of the fiber optic cable 50 is long enough, such as when the fiber optic cable 50 is pulled beyond the slack within the fiber optic cable 50, the cutting blades 62 may overcome the bias created by the springs 70 and move to the second position and thus cut the fiber optic cable 50. More specifically, at least a tip of a cutting blade 62 may be at least partially pierced into the outer sheath of a portion of the fiber optic cable. Due to the angle of the cutting blade 62 as illustrated in FIG. 9, the tip of the cutting blade 62 would disengage from the outer sheath in response to movement of the pierced portion toward the support point 74 illustrated in FIG. 9 (i.e., rightward movement). But in response to movement of the pierced portion away from the support point 74 in FIG. 9 (i.e., leftward movement), the tip of the cutting blade 62 would be pushed by the outer sheath causing the cutting blade to rotate further into the fiber optic cable 50 as illustrated in FIG. 10 and thus cutting the fiber optic cable 50. Due to the slack in the fiber optic cable 50, portions of the fiber optic cable 50 away from the tip of the cutting blade 62 may move without affecting the tip of the cutting blade 62 because the pierced portion may remain substantially stationary. However if any portion of the fiber optic cable 50 is moved beyond the slack of the fiber optic cable 50 then such movement may lead to the cutting of the fiber optic cable 50 by the cut-off apparatus 60. As discussed above, cutting the fiber optic cable 50 may terminate any stress on the support point 74 created by the pulling of the fiber optic cable 50.

Although the illustrated embodiment includes two cutting blades 62, it is understood in some exemplary embodiments, the cut-off apparatus 60 may have only one cutting blade or more than two cutting blades. For example, the cut-off apparatus 60 may have one cutting blade that moves between first and second positions. In the first position, the cutting blade may pinch the fiber optic cable against a support surface. In the second position, the cutting blade cuts through the fiber optic cable.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An assembly comprising:
    a fiber optic cable having a length sufficient for the fiber optic cable to extend between a first support point and a second support point and at least partially along an underlying surface;
    a fastener for elevating the length of fiber optic cable above the underlying surface, the fastener configured to hold a wrap of at least a portion of the fiber optic cable, and to release the wrap of the at least a portion of the fiber optic cable in response to a force exerted against the fiber optic cable greater than a threshold value; and
    a cut-off apparatus for cutting the fiber optic cable in response to the fiber optic cable being pulled once slack in the fiber optic cable has been expended.

2. The assembly according to claim 1 comprising a plurality of fasteners configured to hold a serpentine wrap of at least a portion of the fiber optic cable.

3. The assembly according to claim 1 comprising at least two fasteners configured to hold a coil wrap of at least a portion of the fiber optic cable.

4. The assembly according to claim 1 further comprising a frame member for providing support to the wrap.

5. The assembly according to claim 4, wherein the frame member being attached to one of the first support point and the second support point.

6. The assembly according to claim 4, wherein the frame member remains substantially stationary during the release of the wrap.

7. The assembly according to claim 4, wherein the frame member rotates during the release of the wrap.

8. The assembly according to claim 4, wherein the frame member being positioned between the first and second support points.

9. An assembly comprising:
a fiber optic cable having a length sufficient to both extend aerially above an underlying surface from a first support point to a second support point and to also provide sufficient slack to allow the fiber optic cable to extend at least partially along the underlying surface, wherein the fiber optic cable includes a wrapped portion for storing a portion of the slack and wherein the wrapped portion being releasable in response to a force acting on the fiber optic cable exceeding a threshold value; and
a cut-off apparatus for cutting the fiber optic cable in response to the fiber optic cable being pulled once slack in the fiber optic cable has been expended.

10. The assembly according claim 9 further comprising a fastener configured to hold at least two adjacent portions of the fiber optic cable together up to the threshold value.

11. The assembly according to claim 10, wherein the wrapped portion includes a plurality of back and forth folds.

12. The assembly according to claim 9 further comprising a frame member for supporting the wrapped portion of the fiber optic cable.

13. The assembly according to claim 12 wherein the frame member being configured to rotate and the wrapped portion being coiled at least partially around the frame member allowing for the release of the wrapped portion through the rotation of the frame member.

14. The assembly according to claim 13 further comprising a fastener configured to hold at least two adjacent portions of the fiber optic cable together.

15. The assembly according to claim 13 further comprising a fastener configured to hold a portion of the fiber optic cable to the frame member.

16. The assembly according to claim 12 further comprising a fastener configured to hold the wrapped portion of the fiber optic cable to the frame member up to the threshold value.

17. The assembly according to claim 16 wherein the frame member being attached to one of the first support point and the second support point.

18. The assembly according to claim 16 wherein the frame member being positioned between the first support point and the second support point.

19. A method comprising:
providing a fiber optic cable having a length sufficient to both extend aerially above an underlying surface from a first support point to a second support point and to also provide sufficient slack to allow the fiber optic cable to extend at least partially along the underlying surface;
supporting the fiber optic cable between the first and second support points;
wrapping at least a portion of the fiber optic cable to provide a wrapped portion for storing at least a portion of the slack, wherein the wrapped portion being releasable in response to a force acting on the fiber optic cable exceeding a threshold value; and
cutting the fiber optic cable in response to the fiber optic cable being pulled once slack in the fiber optic cable has been expended.

20. The method according to claim 19 further comprising holding at least two adjacent portions of the fiber optic cable together up to the threshold value with at least one fastener.

21. The method according to claim 19 further comprising supporting the wrapped portion of the fiber optic cable upon a frame member.

* * * * *